United States Patent [19]

Cimenti

[11] Patent Number: 4,971,546
[45] Date of Patent: Nov. 20, 1990

[54] MACHINE TO ROLL DOUGH INTO A SUBSTANTIALLY DISC-SHAPED FORM

[76] Inventor: Antonio Cimenti, Via Baron 15, 30027 San Dona' Di Piave (VE), Italy

[21] Appl. No.: 238,795

[22] Filed: Aug. 30, 1988

Related U.S. Application Data

[63] Continuation-in-part of Ser. No. 938,433, Dec. 5, 1986, abandoned.

[30] Foreign Application Priority Data

Dec. 10, 1985 [IT] Italy .................... 83439 A/85

[51] Int. Cl.$^5$ ............................................. A21C 3/02
[52] U.S. Cl. .................................. 425/337; 425/366; 426/502
[58] Field of Search .................. 425/335, 357, 366; 426/502

[56] References Cited

U.S. PATENT DOCUMENTS

| | | | |
|---|---|---|---|
| 3,883,283 | 5/1975 | Herrera | 425/337 |
| 3,999,926 | 12/1976 | Victor | 425/337 |
| 4,375,349 | 3/1983 | Vrbanek | 425/337 X |
| 4,403,937 | 9/1983 | Zamparelli et al. | 425/337 |
| 4,636,164 | 1/1987 | Bellotto et al. | 425/337 |

Primary Examiner—Charles Hart
Attorney, Agent, or Firm—Workman, Nydegger & Jensen

[57] ABSTRACT

A machine to roll dough into a substantially disc-shaped form includes two pairs of rollers and a device for rotating and accompanying the rolled dough from the first pair of rollers to the second pair of rollers. As the dough exits the first pair of rollers it rests on the lower edge of a small guide balance which moves the dough in a fixed trajectory and rotates the dough such that the dough enters the second pair of rollers in a direction, in relation to the dough approximately perpendicular to the direction the dough exited the first pair of rollers. The guide balance follows the same trajectory regardless for variations in the weight of the dough.

16 Claims, 3 Drawing Sheets

MACHINE TO ROLL DOUGH INTO A SUBSTANTIALLY DISC-SHAPED FORM

RELATED APPLICATION

This application is a continuation-in-part application of application Ser. No. 06/938,433, filed Dec. 5, 1986, and now abandoned in the name of the inventor hereof, and entitled "Machine to Roll Out Substantially Disc-Shaped Forms of Alimentary Pasta," which is incorporated herein by specific referennce.

BACKGROUND

1. Field of the Invention

The invention relates to a machine which will roll out substantially disc-shaped forms of fresh dough. More particularly, the invention is convenient for preparing disc-shaped forms of fresh dough for the preparation of pizza, buns, cakes, and other similar foods.

2. The Prior Art

In order to roll dough into a substantially disc-shaped form, a piece of dough is passed through one pair of rollers, rotated 90° and passed through another pair of rollers. Several machines for rolling dough are known in the art.

U.S. Pat. No. 3,999,926 to Victor describes a machine to make disc-shaped forms of fresh dough by rolling the dough between two pairs of parallel rollers, arranged so that one is upstream and the other is downstream on a tilted sliding surface. A device for rotating the dough is located between the two pairs of rollers so that when the dough leaves the first pair of rollers in an ablong shape, the rotation device turns the dough about 90° enabling the dough to be rolled transversely and obtain a form which is substantially disc-shaped. The rotation device consists of a plate, hinged at the base and counterbalanced, which receives the dough after the first rolling and, due to the weight of dough, rotates approximately 90°.

The Victor mahine is ineffective because the dough rotates properly only if it follows an intermediate pathway. If the dough is placed on the left side of hopper 4 (close to the rotation pin 8), the plate does not rotate, and if the dough is placed on the right side of the hopper, rotation is insuffcient. Moreover, the counterweights must be adjusted according to the weight of the dough. If the counterweights are not properly adjusted, the rotating plate fails to rotate or rotates insufficiently. The resulting rolled pasta is not uniform or substantially round. In addition, the upper edge of the rotating plate tends to block or clog the movement of the dough and the rotating plate.

Italian Patent Application No. 83639A/77, filed on Oct. 11, 1977 in the name of Bovolenta, discloses a rolling machine substantially similar to the Victor machine but in which the rotation device consists of an "L"-shaped arm externally hinged at the top which receives the elongated dough from the first pair of rollers and turns the dough 90° due to weight unbalancing, and then slides it on to the second pair of rollers. This rotation device has the drawback of not being able to accompany the dough from the first pair of rollers to the second pair which results in frequent irregularities in the final rolled product.

Another known device, decribed in U.S. Pat. No. 4,403,937 to Zamparelli et al ., contains two pairs of rollers arranged at right angles and a rotation device consisting of a small balance which, to a lesser extent determines the rotation of the dough coming from the first pair of rollers, but which has the main function of diverting the trajectory of the dough and conveying it to the second pair of rollers.

This device has the drawback that the proper diversion of the dough's trajectory and its rotation are difficult to control. Furthermore, the fixed pivot and counterweight of the diverting lever arm fix and reduce the field of action so that the dough does not always follow the optimal intermediate path. In addition, the fixed pivot and counterweight limit the dough weight to between 150 and 200 grams. Lastly, a path corrector means is employed that actually proves to be an obstacle to the rotation of the dough.

U.S. Pat. No. 4,636,164 to Bellotto et al. discloses a machine which is subtantially like the device described in the Victor Patent, but the rotation device consists of a small balance with two counterbalanced hinged arms. One hinged arm is fixed to the machine support and the other arm is hinged to the end of the first arm and supports the aforesaid balance. The balance is designed to receive the rollled dough from the first pair of rollers and accompany the dough through a 90° rotation to the second pair of rollers for the final rolling.

Although this device "accompanies" the dough from one pair of rollers to the other, it is not able to accurately control the dough trajectory gradually and constantly, since it uses two counterbalancing arms which are difficult to regulate, set-up, and control. The counterbalancing arms will only function properly if the counterweights are properly adjusted for the precise dough weight to be used. Due to the fact that the dough is not always of an exact constant weight, the device is not reliable. Other solutions are available on the market where the pairs of rollers are not parallel with respect to each other, but are titled at less than 90°. These devices typically use a diverting and rotating device similar to that used in the Bovolenta device described above, but they do not consistently produce an optimum result. Still, other methods of pasta dough rolling utilize very complex machines with either conveyor belt systems to transport the dough or transmission means for rolling the dough. This added complexity causes problems due to sophisticated set-up and repairs without a more uniform product.

From the foregoing, it will be appreciated that what is needed in the art is a machine for rolling dough into a substantially disc-shaped form which accompanies and rotates the dough as it passes from one pair of rollers to another along a fixed trajectory such that the proper rotation is achieved regardless of small or large variations in the weight of the dough.

Additionally, it would be a significant advancement in the art to provide a machine for rolling dough into a substantially disc-shaped form which does not require constant adjustment to compensate for variations in the weight of the dough.

It would be another advancement in the art to provide a machine for rolling dough into a substantially disc-shaped form which is simple to set-up, monitor, and repair while yielding a more uniformly disc-shaped product.

The foregoing, and other features and objects of the present invention are realized in the machine for rolling dough into a substantially disc-shaped form disclosed and claimed herein.

BRIEF SUMMARY AND OBJECT OF THE INVENTION

The present invention is directed to a machine for the preparation of disc-shaped forms of dough. The machine includes two pairs of rollers and a device for rotating and accompanying the rolled dough from the first pair of rollers to the second pair of rollers. As the dough exits the first pair of rollers, it rests on the lower edge of a small accompanying guide balance which moves in a fixed trajectory towards the second pair of rollers. As the small guide balance moves in its trajectory, it rotates the dough and places the dough for entry into the second pair of rollers in a direction transverse to the direction the dough passed through the first set of rollers. The rotation device is conceived so that the guide balance is constrained to always follow the same trajectory.

It is, therefore, an object of the present invention to eliminate the inconveniences and non-uniform final product common in the prior art devices. This is accomplished because the rolled dough from the first pair of rollers is always moved along the same trajectory and with the same degree of prearranged rotation to the second pair of rollers. In additioin, the dough rotation device is further simplified because multiple counterbalances and adjusting screws do not need to be set or adjusted.

These and other objects and features of the present invention will become more fully apparent from the following description and appended claims taken in conjunction with the accompanying drawings or may be learned by the practice of the invention.

BRIEF DESCRIPTION OF THE DRAWINGS

In order to more fully understand the manner in which the above-recited advantages and objects of the invention are obtained, a more particular description of the invention will be rendered by referemce to specific embodiments thereof which are illustrated in the appended drawings. Understanding that these drawings depict only typical embodiments of the invention and are therefore not to be considered limiting of its scope, the presently preferred embodiments and the presently understood best mode of the invention will be described with additional detail through use of the accompanying drawings in which.

DETAILED DESCRIPTION OF THE PREFERRED EMBODIMENTS

The present invention is directed to a machine for rolling dough into a substantially disc-shaped or round form. To achieve the foregoing, dough passes through two pairs of rollers. After being rolled by the first pair of rollers, the dough is oblong along a longitudinal axis. The dough is then guided and rotated along a fixed trajectory to the second pair of rollers. The dough is rotated such that it passes through the second pair of rollers in a direction perpendicular or transverse to the longitudinal axis of the dough. In this way, the dough is rolled twice, in two directions at approximately right angles to each other.

Figure 1:
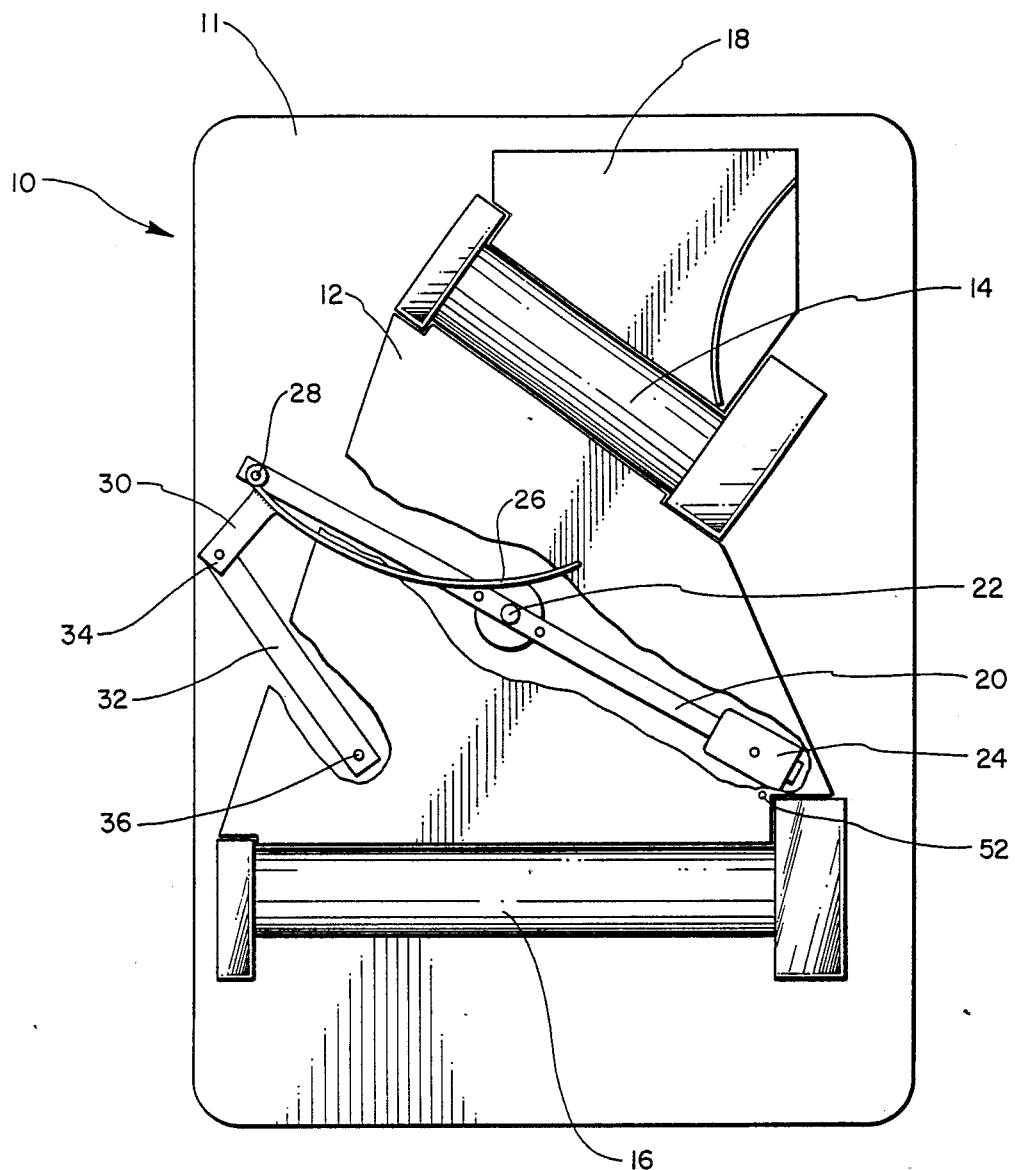
FIG. 1 is a schematic layout view of one presently preferred embodiment within the scope of the present invention.
Figure 3:
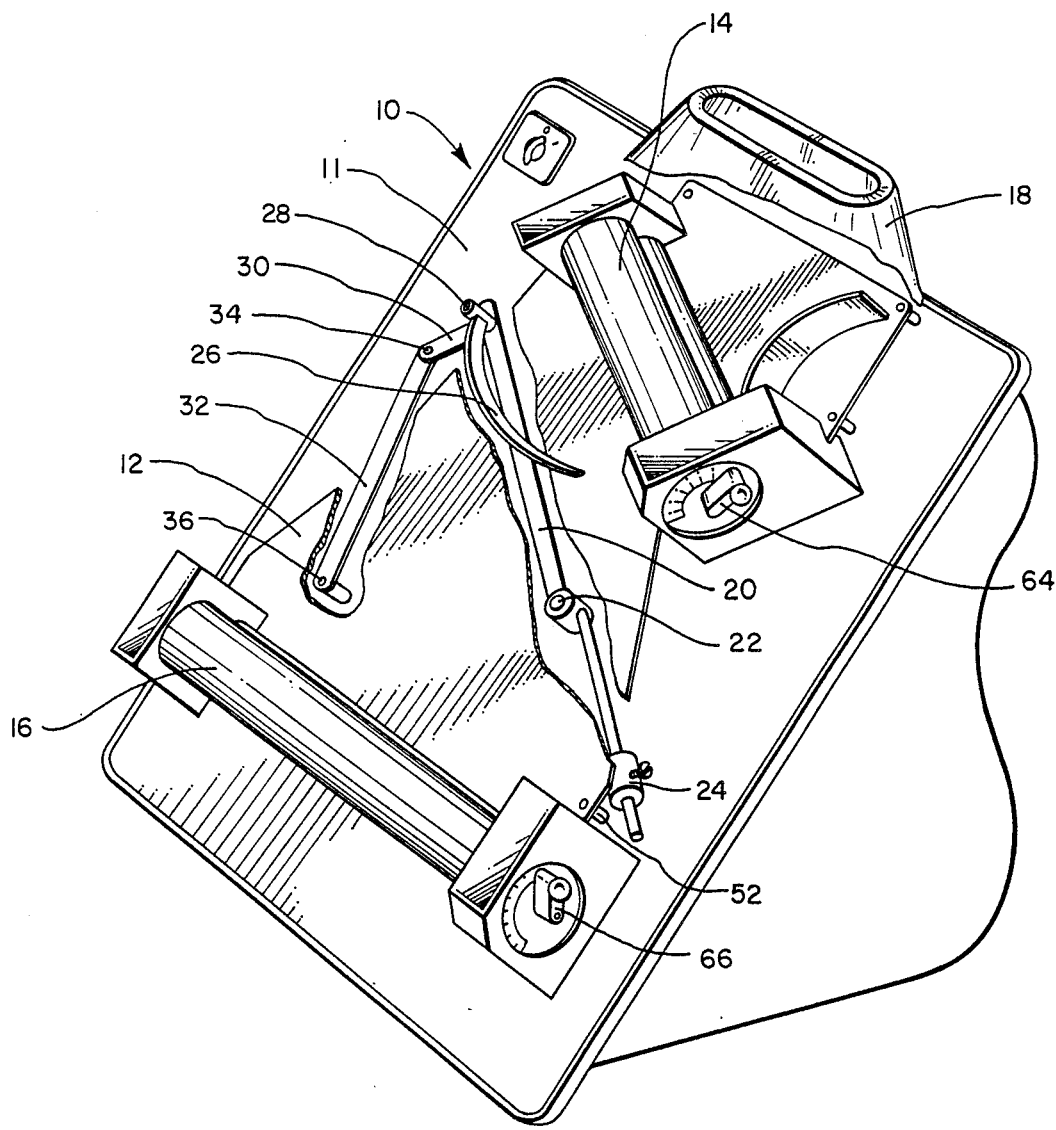
FIG. 3 is a perspective view of the embodiment within the scope of the present invention illustrated in FIG. 1.

Reference in now made to the drawings wherein like parts are designated with like numerals throughout. Referring first to FIGS. 1 and 3, one presently preferred embodiment of the present invention is illustrated and generally designated 10.

Dough rolling machine 10 has a tilted support table 11 and a tilted surface 12. The tilted support table and the tilted surface are substantially parallel. In the embodiment of the present invention illustrated in FIG. 3, support table 11 and tilted surface 12 are preferably inclined an angle in the range from about 60° to about 80°. Support table 11 provides support for attaching the various mechanical parts of the dough rolling machine, including tilted surface 12. Rolled dough passing through the dough rolling machine slides on tilted surface 12.

A first pair of rollers 14 and a second pair of rollers 16 are located at the upper and lower edges of tilted surface 12, respectively. First pair of rollers 14 and second pair of rollers 16 are preferably not parallel to each other and second pair of rollers 16 is preferably substantially horizontal. In the embodiment illustrated in FIG. 3, the angle between first pair of rollers 14 and second pair of rollers 16 is about 35°. This angle may range from about 20° to about 60°, preferably in the range from about 30° to about 40°.

A feed box 18 for the pasta is located above the first pair of rollers 14. A cover (not shown) is preferably positioned over the rollers and support table to protect the moving mechanical parts of the dough rolling machine. The upper portion of the cover showing an opening into feed box 18 is partially illustrated in FIG. 3.

A supporting lever arm 20 is rotatably attached to support table 11 at a central hinge 22 located between the two pairs of rollers. Lever arm 20 is preferably located beneath tilted surface 12 so that the movement of dough between first pair of rollers 14 and second pair of rollers 16 is unencumbered.

Lever arm 20 is counterbalanced at one end with counterweight 24. Counterweight 24 is located on the side of the machine where roller pairs 14 and 16 tend to converge. Lever arm 20 is counterbalanced at the other end with a small, arc-shaped guide balance 26. Guide balance 26 is generally curved and adapted to receive various round dough sizes. Guide balance 26 is preferably positioned above tilted surface 12. A hinge 28 pivotally connects guide balance 26 with lever arm 20. Counterweight 24 is limted by stop 52 so that guide balance 26 does not extend into and interfere with first pair of rollers 14.

A solid-backed arm 30 is firmly attached to guide balance 26 at a point adjacent hinge 28. Solid-backed arm 30 is further pivotally attached to a second arm 32 at a hinge 34. Second arm 32 is pivotally attached to support table 11 at a fixed hinge 36 located between central hinge 22 and second pair of rollers 16.

In operation, guide balance 26 receives the dough as it is discharged from first pair of rollers 14. The guide balance moves by the weight of the dough and descends gradually in a controlled and fixed trajectory. A control mechanism, comprising the interaction of solid-backed arm 30, hinge 34, second arm 32, and fixed hinge 36, forces guide balance 26 to pivot at a controlled angular speed in the opposite direction of the rotation of lever arm 20 which supports the guide balance.

As guide balance 26 descends under the weight of the dough, hinge 28 moves towards fixed hinge 36. At the same time, second arm 32 causes solid-backed arm 30 to rotate around hinge 28 in a direction opposite the rotation of lever arm 20. Because solid-backed arm 30 is firmly attached to guide balance 26, any movement of the solid-backed arm produces a corresponding movement in guide balance 26. Thus, as guide balance 26 descends, it is forced to pivot around hinge 28 due to the interaction of solid-backed arm 30, hinge 34, second arm 32, and fixed hinge 36.

An important advantage of the control mechanism is that guide balance 26 follows a fixed trajectory regardless of the weight of the dough. Thus, the present invention avoids many of the problems known in the art associated with the need to constantly monitor and adjust the dough rolling machine to compensate for variations in the weight of the dough.

As guide balance 26 descends, it rotates the dough so that the dough enters second pair of rollers 16 in a direction approximately transverse to the direction the dough exited first pair of rollers 14. After descending to the second pair of rollers, the guide balance lets the dough fall onto the second pair of rollers, suitably rotated for a right-angles entry.

Depending on the size and weight of dough to be rolled by the dough rolling machine, the gap separating each roller of a roller pair may need to be adjusted. For example, if a relatively large piece of dough is to be roller, the gap between first pair of rollers 14 should be large. The gap between second pair of rollers 16 is typically less than the gap between the first pair of rollers. It will be appreciated that proper adjustment of the distance separating each roller of a roller pair is important to roll dough into a uniformly round form.

In order to adjust the gap separating each roller pair, roller adjusters are preferably provided. As illustrated in FIG. 3, first roller adjuster 64 adjusts the distance between the first pair of rollers. Similarly, second roller adjusters 66 adjusts the distance between the second pair of rollers.

Figure 2:
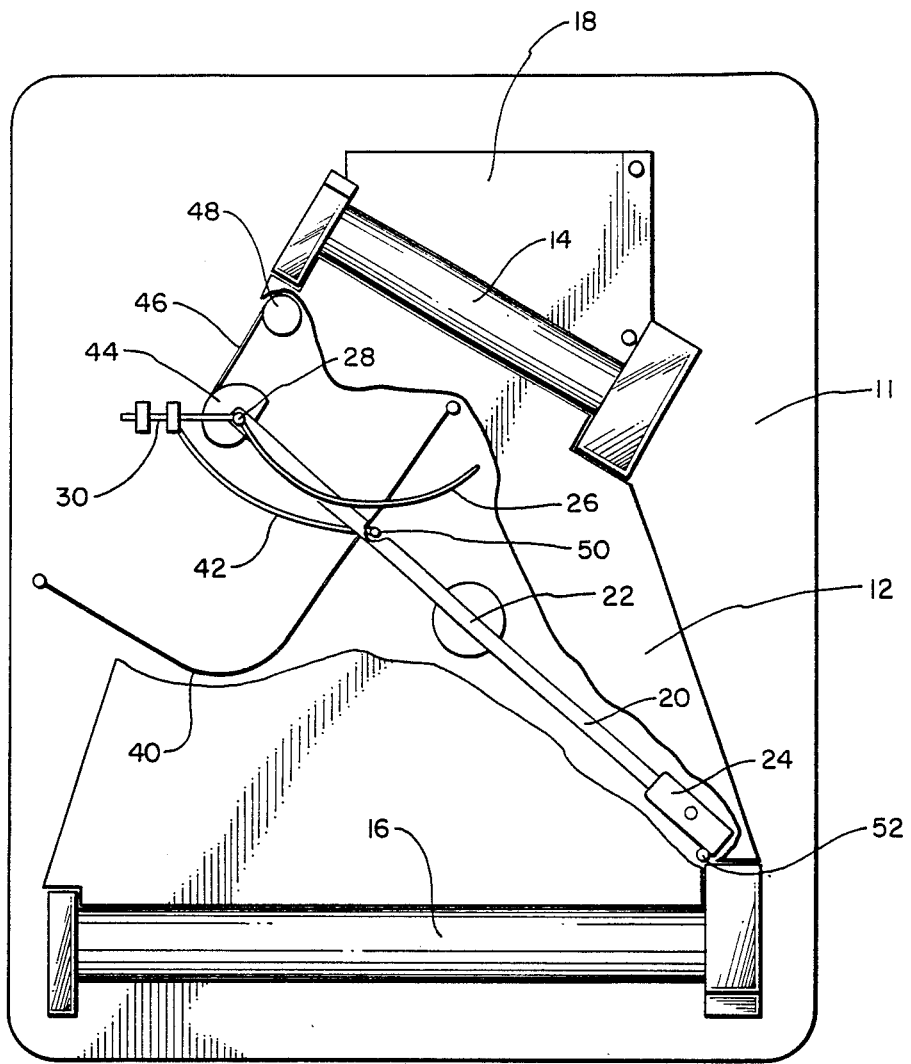
FIG. 2 is a schematic layout view of another embodiment within the scope of the present invention.

In the embodiment illustrated in FIG. 2, the dough rolling machine contains a different control mechanism than the embodiment of FIGS. 1 and 3. The descent and trajectory of guide balance 26 are controlled by control arm 42, as connected and led by control arm guide 50, which follows guide path 40. The guide balance is firmly attached to cam 44. Cam 44 is partially wound by stretching wire 46 stretched from an elastic winding reel 48. The length of stretching wire 46 released from winding reel 48 is such that when a pre-set point is reached along the guide path 40, no more wire 46 is released from winding reel 48. At this point, guide balance is forced to turn clockwise and let the dough fall on the second pair of rollers 16.

The stretching wire 46 and winding reel 48 have the particular function of facilitating the return of the guide balance 26 to the starting position beneath the first pair of rollers 14. Stop 52 limits further movement of lever 20 so that guide balance 26 is stopped at the same position as before, ready to receive the next rolled dough from first pair of rollers 14. This embodiment is particularly effective at forcing the guide balance to rotate the dough with respect to the supporting arm 20 in the desired fashion.

It will be appreciated that many other control mechanism can be foreseen to control the trajectory and rotation of guide balance 26 while it guides dough from the first pair of rollers to the second pair of rollers.

From the foregoing, it will be appreciated that the present invention provides a machine for rolling dough into a substantially disc-shaped form which accompanies and rotates the dough as it passes from one pair of rollers to another along a fixed trajectory such that the proper rotation is achieved regardles of small or large variations in the weight of the dough.

Additionally, it will be appreciated that the present invention further provides machine for rolling dough into a substantially disc-shaped form which does not require constant adjustment to compensate for variations in the weight of the dough.

Finally, it will be appreciated that the present invention provides a machine for rolling dough into a substantially disc-shaped form which is simple to set up, monitor, and repair while yielding a more uniformly disc-shaped product.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for rolling a quantity of dough into a substantially disc-shaped form comprising:
    an inclined surface on which roller dough slides, having an upper edge and a lower edge said inclined surface being supported by an inclined support table;
    a first pair of rollers located adjacent the upper edge of the inclined surface for receiving and rolling the quantity of dough along a longitudinal axis of the dough;
    a second pair of rollers located adjacent the lower edge of the inclined surface for receiving and rolling the dough rolled by the first pair of rollers;
    a guide balance capable of translational and rotational movement in relation to the inclined surface, said guide balance receiving rolled dough as the dough exits the first pair of rollers and moving through a line of motion in response to the weight of the dough that causes the dough to enter the second pair of rollers in a direction approximately perpendicular to the longitudinal axis of the dough; and
    means for controlling the movement of the guide balance such that the line of motion is fixed irrespective of variations in the weights of other quantities of dough, said controlling means comprising a sequence of hinged linkages between at least two pivot points fixed relative to the inclined support table.

2. An apparatus for rolling a quantity of dough into a substantially disc-shaped form as defined in claim 1 wherein the controlling means comprises a lever arm rotatably attached to the inclined support table at an intermediate position between the first pair of rollers and the second pair of rollers, said lever arm being laterally hinged to the guide balance.

3. An apparatus for rolling a quantity of dough into a substantially disc-shaped form as defined in claim 2 wherein the guide balance is firmly attached to the means for controlling the movement of the guide balance at a position adjacent the hinge connecting the guide balance to the lever arm.

4. An apparatus for rolling a quantity of dough into a substantially disc-shaped form as defined in claim 3 wherein the means for controlling the movement of the guide balance comprises a dual arm linkage, one arm being pivotally attached to the inclined support table at a fixed position between the first pair of rollers and the second pair of rollers.

5. An apparatus for rolling a quantity of dough into a subtantially disc-shaped form as defined in claim 4 wherein the means for controlling the movement of the guide balance further comprises a first arm and a second arm pivotally attached together at a hinge, said first arm being firmly attached to the guide balance at a position adjacent the hinge connecting the guide balance to the lever arm, said second arm being pivotally attached to the inclined support table at a fixed position between the first pair of rollers and the second pair of rollers.

6. An apparatus for rolling a quantity of dough into a substantially disc-shaped form as defined in claim 2 further comprising a counterweight attached to the lever arm for counterbalancing the guide balance.

7. An apparatus for rolling a quantity of dough into a substantially disc-shaped form as defined in claim 2 wherein the first and second pairs of rollers are not parallel and the second pair of rollers is substantially horizontal.

8. An apparatus for rolling a quantity of dough into a substantially disc-shaped form as defined in claim 7 wherein the angle between the first pair of rollers and the second pair of rollers is in the range from about 20° to about 60°.

9. An apparatus for rolling a quantity of dough into a substantially disc-shaped form as defined in claim 2, wherein the inclined surface is inclined an angle in the range from about 60° to about 80°.

10. An apparatus for rolling a quantity of dough into a substantially disc-shaped form as defined in claim 1 wherein the sequence of pivoted linkages comprises a first, second, third, and fourth pivot points arranged sequentially, said first and fourth pivot points being fixed relative to the inclined support table, said first and second pivot points being rigidly connected by a lever arm, said second and third pivot points being rigidly connected by the combined action of the guide balance rigidly attached to a first arm, said third and fourth pivot points being rigidly connected by a second arm.

11. An apparatus for rolling a quantity of dough into a substantially disc-shaped form as defined in claim 1 wherein the sequence of pivoted linkages comprises a first arm rigidly attached to one end to the guide balance and pivotally secured at the other end thereof to a second arm, said second arm being pivotally secured to the inclined support table, said guide balance being hinged at one end thereof to a lever arm, said lever arm being pivotally attached to the inclined support table at an intermediate position between the first pair of rollers and the second pair of rollers.

12. An apparatus for rolling a quantity of dough into a substantially disc-shaped form as defined in claim 1 wherein the sequence of pivoted linkages comprises a first, second, third, and fourth pivot points arranged sequentially, said first and fourth pivot points being fixed relative to the inclined support table.

13. A method for preparing substantially disc-shaped forms of fresh dough comprising the steps of:
 (a) passing a quantity of fresh dough through a first pair of rollers such that the dough is rolled along a longitudinal axis of the dough;
 (b) transporting the dough from the first pair of rollers to a second pair of rollers along a controlled and fixed line of motion regardless of individual variations in the weights of other quantities of dough;
 (c) rotating the dough during the transporting step such that the dough enters the second pair of rollers in a direction approximately perpendicular to the longitudinal axis of the dough, said rotating and transporting steps being performed by a guide balance rigidly attached to a sequence of hinged linkages between at least two fixed pivot points on an inclined support table; and
 (d) passing the quantity of dough through the second pair of rollers such the rolled dough exiting the second pair of rollers is in a substantially disc-shaped form.

14. An apparatus for rolling a quantity of dough into a substantially disc-shaped from comprising:
 an inclined surface on which rolled dough slides, having an upper edge and a lower edge said inclined surface being supported by an inclined support table;
 a first pair of rollers located adjacent the upper edge of the inclined surface for receiving and rolling the quantity of dough along a longitudinal axis of the dough;
 a second pair of rollers located adjacent the lower edge of the inclined surface for receiving and rolling the dough rolled by the first pair of rollers;
 a guide balance capable of translational and rotational movement in relation to the inclined surface, said guide balance receiving rolled dough as the dough exits the first pair of rollers and moving through a line of motion in response to the weight of the dough that causes the dough to enter the second pair of rollers in a direction approximately perpendicular to the longitudinal axis of the dough;
 a counterweighted lever arm rotatably attached to the inclined support table at an intermediate position between the first pair of rollers and the second pair of rollers, said lever arm being laterally hinged to the guide balance; and
 means for controlling the movement of the guide balance such that the line of motion is fixed irrespective of variations in the weights of other quantities of dough, said controlling means comprising a cam rigidly fixed to said guide balance, said cam being partially wound by a wire extending from an elastic winding reel.

15. An apparatus for rolling a quantity of dough into a substantially disc-shaped form as defined in claim 14 wherein the elastic winding reel is fixed on the inclined support table.

16. An apparatus for rolling a quantity of dough into a substantially disc-shaped form as defined in claim 14 wherein the means for controlling the movement of the guide balance further comprises a control arm in rigid communication with the guide balance, said control arm following a guide path.

* * * * *

UNITED STATES PATENT AND TRADEMARK OFFICE
CERTIFICATE OF CORRECTION

PATENT NO. : 4,971,546

DATED : November 20, 1990

INVENTOR(S) : ANTONIO CIMENTI

It is certified that error appears in the above-identified patent and that said Letters Patent is hereby corrected as shown below:

```
Title Page:
Abstract, line 13, "regardless for" should be --regardless of--
Column 2, line 35, "Other solutions . . . product." should be
a new paragraph
Column 2, line 37, "titled" should be --tilted--
Column 3, line 25, "additioin" should be --addition--
Column 3, line 39, "referemce" should be --reference--
Column 4, line 13, "an angle" should be --at an angle--
Column 4, line 50, "limted" should be --limited--
Column 6, line 8, "regardles" should be --regardless--
Column 6, line 13, "adjustment" should be --adjustments--
Column 6, line 34, after "edge" insert --,--
Column 7, line 37, after "inclined," insert --at--
Column 8, line 26, after "edge' insert --,-- (2nd occurrence).
```

Signed and Sealed this

Eighth Day of September, 1992

*Attest:*

DOUGLAS B. COMER

*Attesting Officer*  *Acting Commissioner of Patents and Trademarks*